US011215055B2

(12) United States Patent
Stone

(10) Patent No.: US 11,215,055 B2
(45) Date of Patent: Jan. 4, 2022

(54) GAS TURBINE ENGINE ROTOR BALANCING

(71) Applicant: PRATT & WHITNEY CANADA CORP., Longueuil (CA)

(72) Inventor: Paul Stone, Guelph (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/789,959

(22) Filed: Feb. 13, 2020

(65) Prior Publication Data

US 2020/0200013 A1  Jun. 25, 2020

Related U.S. Application Data

(62) Division of application No. 15/341,331, filed on Nov. 2, 2016, now Pat. No. 10,598,018, which is a division of application No. 13/369,684, filed on Feb. 9, 2012, now Pat. No. 9,511,457.

(51) Int. Cl.
*F01D 5/02* (2006.01)
*B23P 15/02* (2006.01)

(52) U.S. Cl.
CPC .............. *F01D 5/027* (2013.01); *B23P 15/02* (2013.01); *F05D 2220/32* (2013.01); *F05D 2230/10* (2013.01); *F05D 2260/15* (2013.01); *Y10T 29/49336* (2015.01)

(58) Field of Classification Search
CPC ......... F01D 5/02; F01D 5/027; F05D 2260/15
See application file for complete search history.

(56) References Cited

U.S. PATENT DOCUMENTS

| | | | |
|---|---|---|---|
| 4,043,147 A | 8/1977 | Wiebe | |
| 4,926,710 A | 5/1990 | Novotny | |
| 5,011,374 A | 4/1991 | Miller | |
| 6,128,820 A | 10/2000 | Nolan et al. | |
| 6,234,912 B1 | 5/2001 | Koschier et al. | |
| 6,354,780 B1 | 3/2002 | Davis et al. | |
| 7,069,654 B2 | 7/2006 | Robbins | |
| 7,303,377 B2 | 12/2007 | Rockarts et al. | |
| 7,445,433 B2 | 11/2008 | Chivers et al. | |
| 7,793,540 B2 | 9/2010 | Robbins | |
| 8,186,961 B2 | 5/2012 | Stone | |
| 8,215,910 B2 | 7/2012 | Belmonte et al. | |
| 2005/0231052 A1 | 10/2005 | Rockarts et al. | |
| 2006/0236796 A1 | 10/2006 | Harada | |
| 2009/0087313 A1 | 4/2009 | Belmonte et al. | |
| 2010/0074752 A1* | 3/2010 | Denis .................. | F01D 5/10 416/144 |
| 2010/0080705 A1 | 4/2010 | Pronovost et al. | |
| 2010/0260605 A1 | 10/2010 | Macfarlane et al. | |

(Continued)

FOREIGN PATENT DOCUMENTS

DE      102006027723 A1    1/2007

*Primary Examiner* — Woody A Lee, Jr.
*Assistant Examiner* — Maxime M Adjagbe
(74) *Attorney, Agent, or Firm* — Norton Rose Fulbright Canada LLP

(57) ABSTRACT

A method of balancing a gas turbine engine rotor comprises the step of obtaining a rotor disc with a circumferential array of balance tabs projecting from a peripheral rim of the disc. Stress shielding scallops are defined in the rotor disc between the tabs. The balancing is achieved by removing material from at least one of the tabs.

7 Claims, 5 Drawing Sheets

(56) References Cited

U.S. PATENT DOCUMENTS

| | | |
|---|---|---|
| 2010/0316496 A1 | 12/2010 | Williams et al. |
| 2011/0027085 A1 | 2/2011 | Glasspoole et al. |
| 2011/0044816 A1 | 2/2011 | Lecuyer et al. |
| 2011/0078901 A1 | 4/2011 | Glasspoole et al. |
| 2011/0296686 A1 | 12/2011 | Strother |
| 2012/0207603 A1 | 8/2012 | Woods et al. |
| 2012/0210579 A1 | 8/2012 | Stone |

\* cited by examiner

GAS TURBINE ENGINE ROTOR BALANCING

RELATED APPLICATIONS

This application is a divisional of U.S. patent application Ser. No. 15/341,331, filed on Nov. 2, 2016 which is a divisional of U.S. patent application Ser. No. 13/369,684 filed on Feb. 9, 2012, and issued as U.S. Pat. No. 9,511,457 B2 on Dec. 6, 2016, the content of which is hereby incorporated by reference.

TECHNICAL FIELD

The application relates generally to gas turbine engines and, more particularly, to balancing of rotors.

BACKGROUND OF THE ART

Gas turbine engine rotors, such as fan, compressor and turbine rotors, can be balanced by removal of material. The material removal process usually involves milling at least one groove or notch into a surface of the rotor, checking the unbalance and then further removing a small amount of material from the notch(es) (typically with a hand held tool) to perfect the balance. These notches may create high stress areas in the rotor. Typically a minimum radius is required at the ends of the balancing notches to keep stresses to an acceptable level. However, the final manual material removal process is not controlled as well as milling and may possibly result in the creation of further stress concentration zones in the form of small undulations at the surface of the notches or in the form of an undercut at the ends of the radius. To control the surface finish and minimize or attempt to correct these surface defects, a polishing operation may then be conducted. However, it is known that polishing will remove beneficial compressive stresses on the surface that are usually present from milling or turning operations.

Accordingly, there is a need for improvements.

SUMMARY

In one aspect, there is provided a method of balancing a gas turbine engine rotor, the method comprising: a) obtaining a rotor disc with a circumferential array of tabs projecting from a peripheral rim of the disc and with stress shielding scallops between the tabs, the tabs having a predetermined initial weight; b) measuring a rotational imbalance of the rotor; and then c) correcting at least a part of the measured imbalance by removing material from at least one of the tabs to reduce the predetermined initial weight thereof to a reduced weight.

In a second aspect, there is provided a manufacturing process for a gas turbine engine rotor having an axis, comprising a) machining a circumferential array of stress shielding scallops in a surface of the rotor about the axis thereof, the stress shielding scallops creating a circumferential array of initial balance tabs projecting from said surface of the rotor; b) observing a rotor imbalance about the axis; and c) substantially correcting the measured imbalance by removing material from at least a selected one of said initial balance tabs.

In a third aspect, there is provided a gas turbine engine rotor comprising a disc adapted to be mounted for rotation about an axis, a circumferentially extending rim at a periphery of the disc, a circumferential array of blades extending radially outwardly from a radially outer surface of the rim, a circumferential array of selectively machinable balance tabs projecting from the rim about the axis of rotation of the disc, wherein circumferentially adjacent balance tabs are spaced by stress shielding scallops defined in the rim, and wherein the balance tabs, prior to balancing, have a pre-established initial weight, and wherein the tabs are selectably machined to a reduced weight in order to balance the gas turbine engine rotor.

DESCRIPTION OF THE DRAWINGS

Reference is now made to the accompanying figures, in which.

DETAILED DESCRIPTION OF THE PREFERRED EMBODIMENTS

Figure 1:
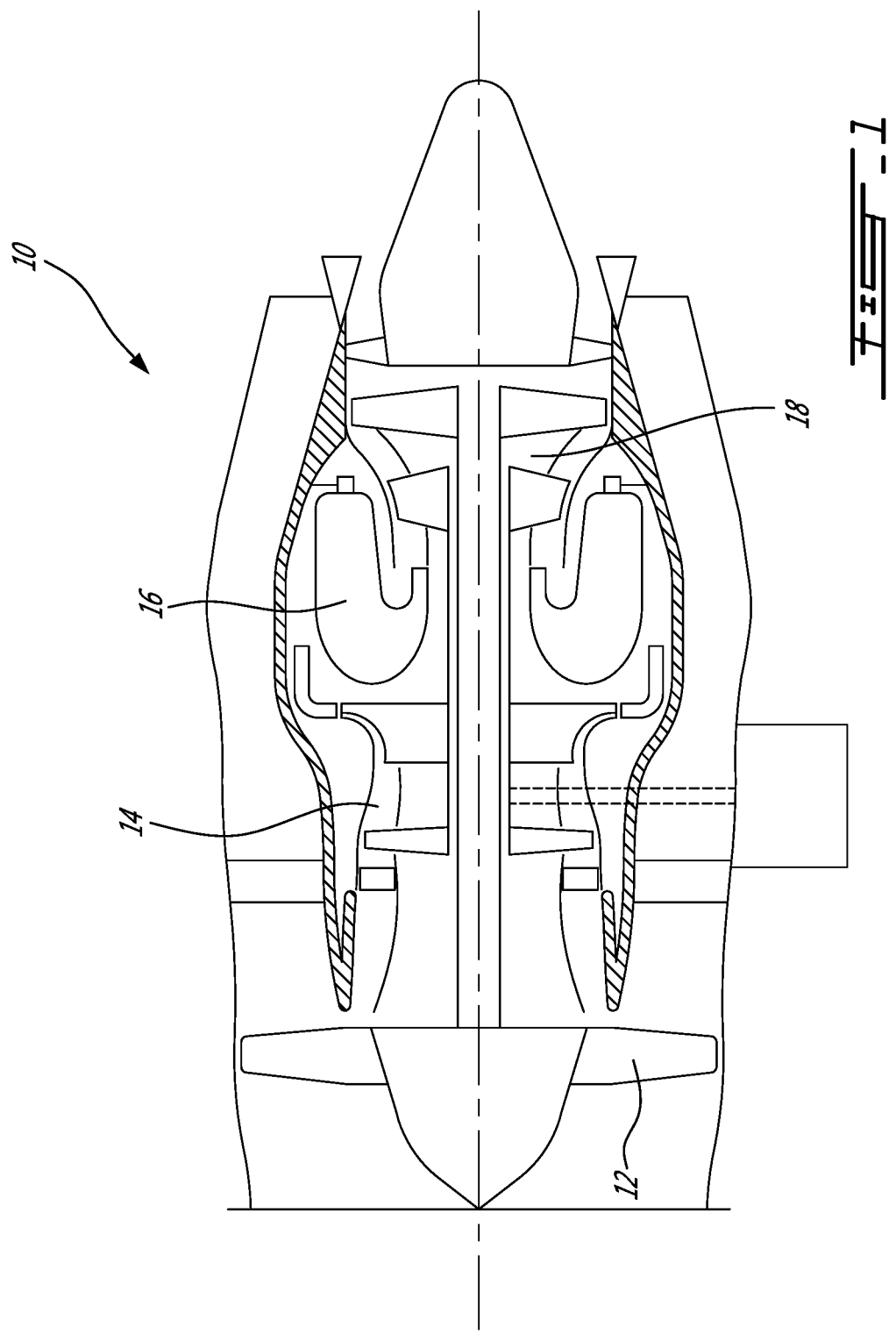
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The fan 12, the compressor 14 and the turbine 18 each have rotary components, which need to be balanced. The rotary components may, for instance, be provided in the form of an integrally bladed rotor commonly referred to as an IBR or a Blisk, or in the form of a bladed rotor assembly comprising a set of individual blades detachably mounted in slots defined in a rim of the rotor disc. While the present balancing method will be hereinafter described in connection with an integrally bladed fan rotor, it is understood that the present balancing approach is also applicable to compressor and turbine rotors. Furthermore, it is to be understood that the balancing method is not limited to IBRs but could also be used for balancing separately bladed rotors.

Figure 2:
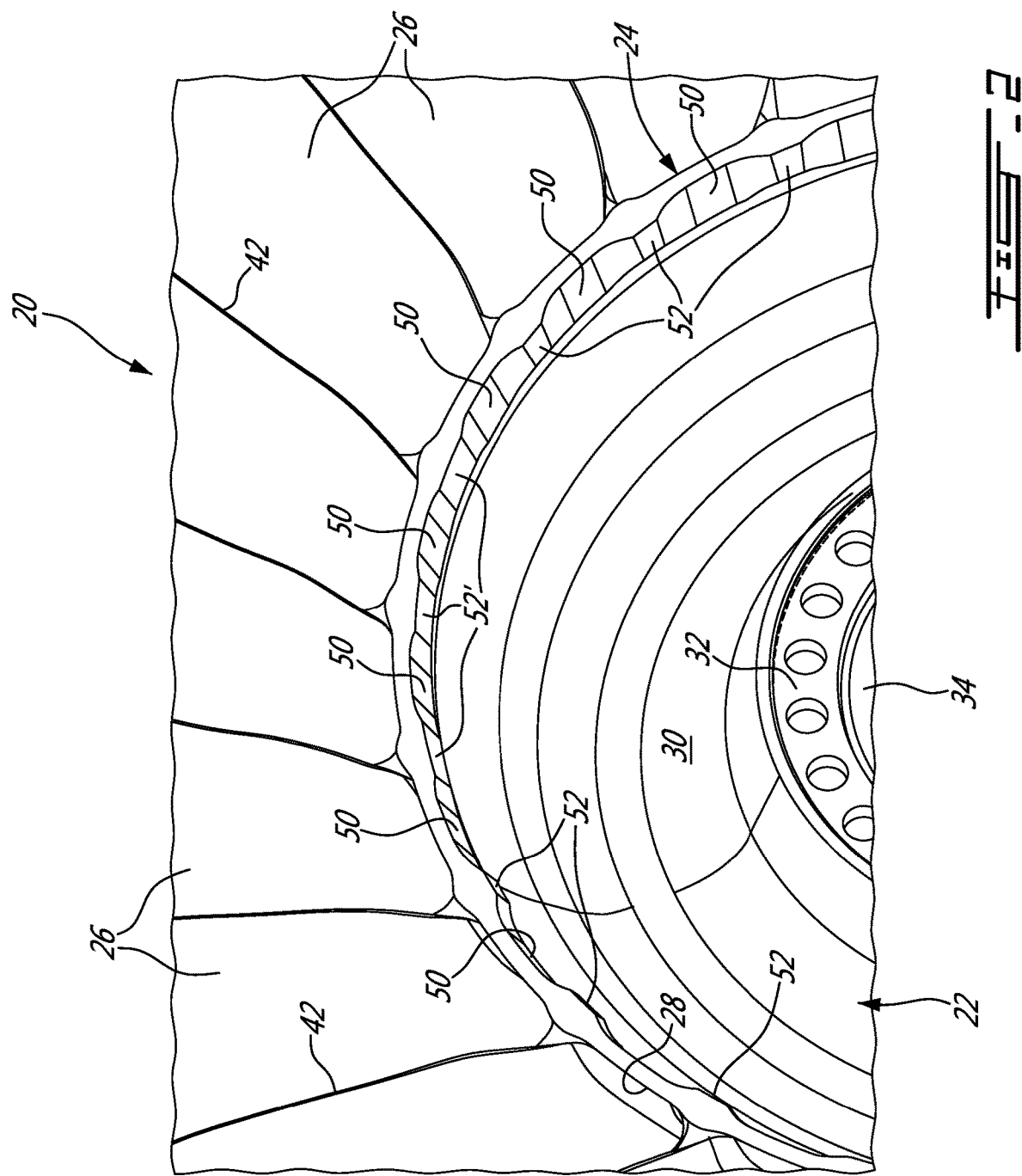
FIG. 2 is a rear isometric view of a portion of a fan rotor with balance tabs machined in the underside of the rear of the rim of the rotor disc, three of the balance tabs have been machined off to their minimum material condition and the other tabs have been left untouched in their as-machined condition.
Figure 3:
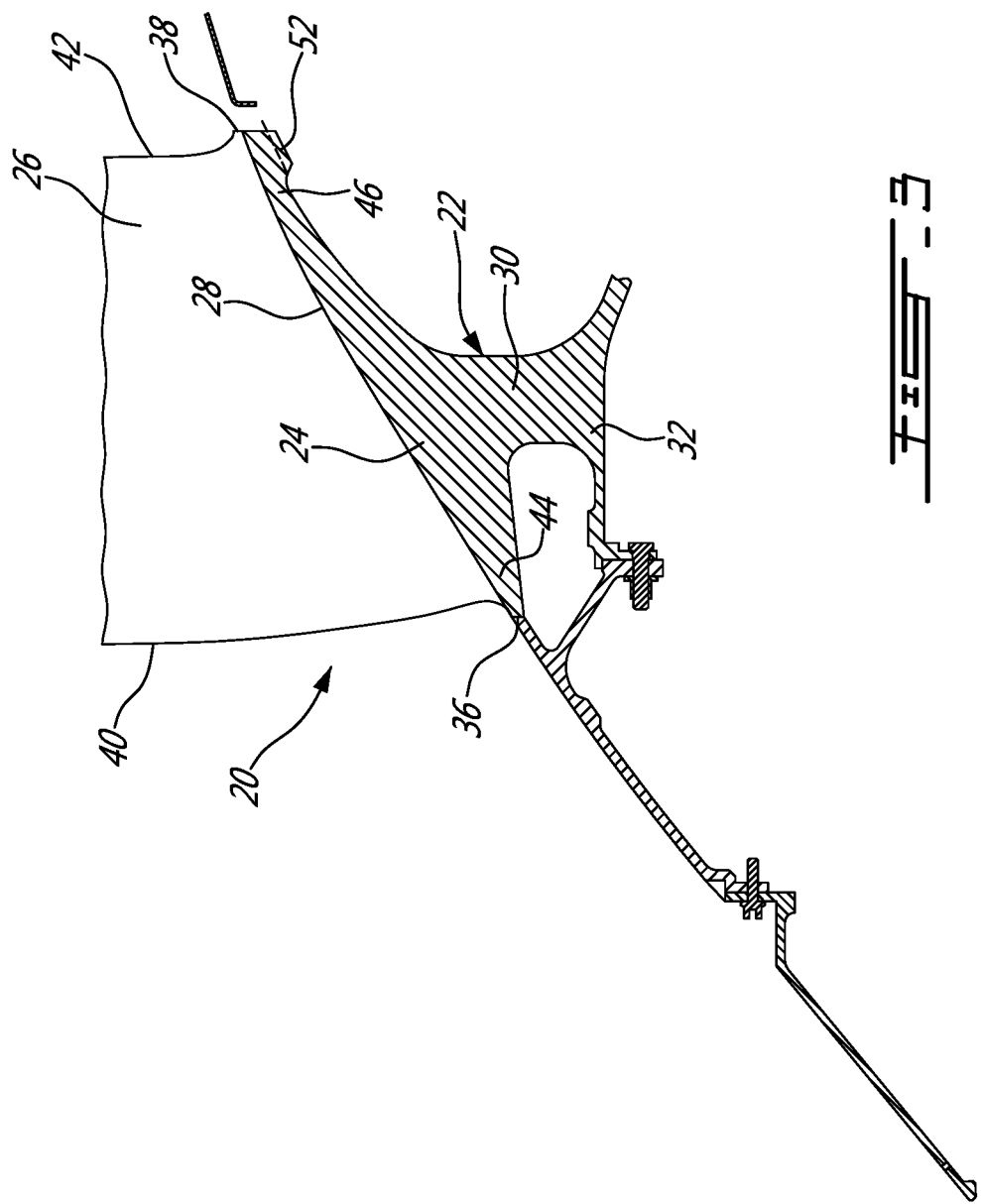
FIG. 3 is an axial cross-sectional view of the fan rotor shown in FIG. 2.

FIGS. 2 and 3 illustrate an integrally bladed fan rotor 20 generally comprising a disc 22 having an axisymetric peripheral annular rim 24, and a set of circumferentially spaced-apart blades 26 projecting radially outwardly from a radially outer surface 28 of the rim 24. According to the illustrated embodiment, the blades 26 and the disc 22 are integrally connected to form a one-piece component. The integrally bladed rotor is typically manufactured from a forged blank of high strength material, such as titanium, and is then suitably machined (or other material removal process) to its final dimensions by appropriate means, such as a high precision multi-axis milling machine. Alternatively, the blades may be welded to the disc.

The disc 22 has a web 30 extending radially inwardly from the rim 24 to an inner hub 32 defining a central bore 34 for receiving a shaft in order to mount the disc 22 for rotation about the centerline axis of the engine 10. As shown in FIG. 3, the rim 24 extends axially from a leading edge 36 to a trailing edge 38. The axial length of the rim 24 between edges 36 and 38 is selected to offer support to the blades 26 from the leading to the trailing edges 40 and 42 thereof. It can also be appreciated from FIG. 3, that the rim 24 has a forward overhang portion 44 and an aft overhang portion 46 extending in a cantilever fashion on axially opposite sides of the disc web 30.

Figure 4:
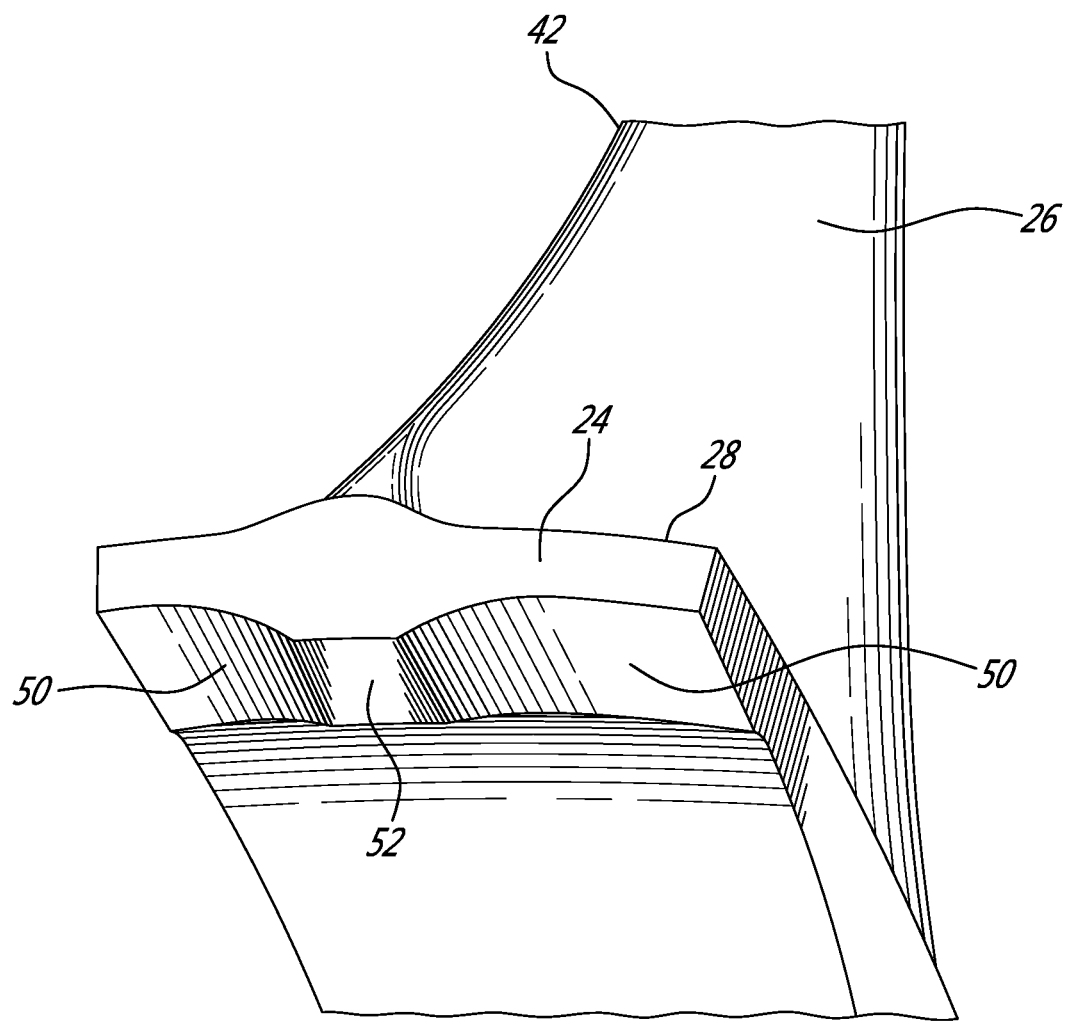
FIG. 4 is an enlarged rear isometric view of a sector of the fan rotor illustrating a pair of stress shielding scallops with a balance tab therebetween as initially machined in the undersurface of the peripheral rim of the rotor disc prior to balancing the rotor, the scallops and tabs forming part of the drawing definition of the rotor.
Figure 5:
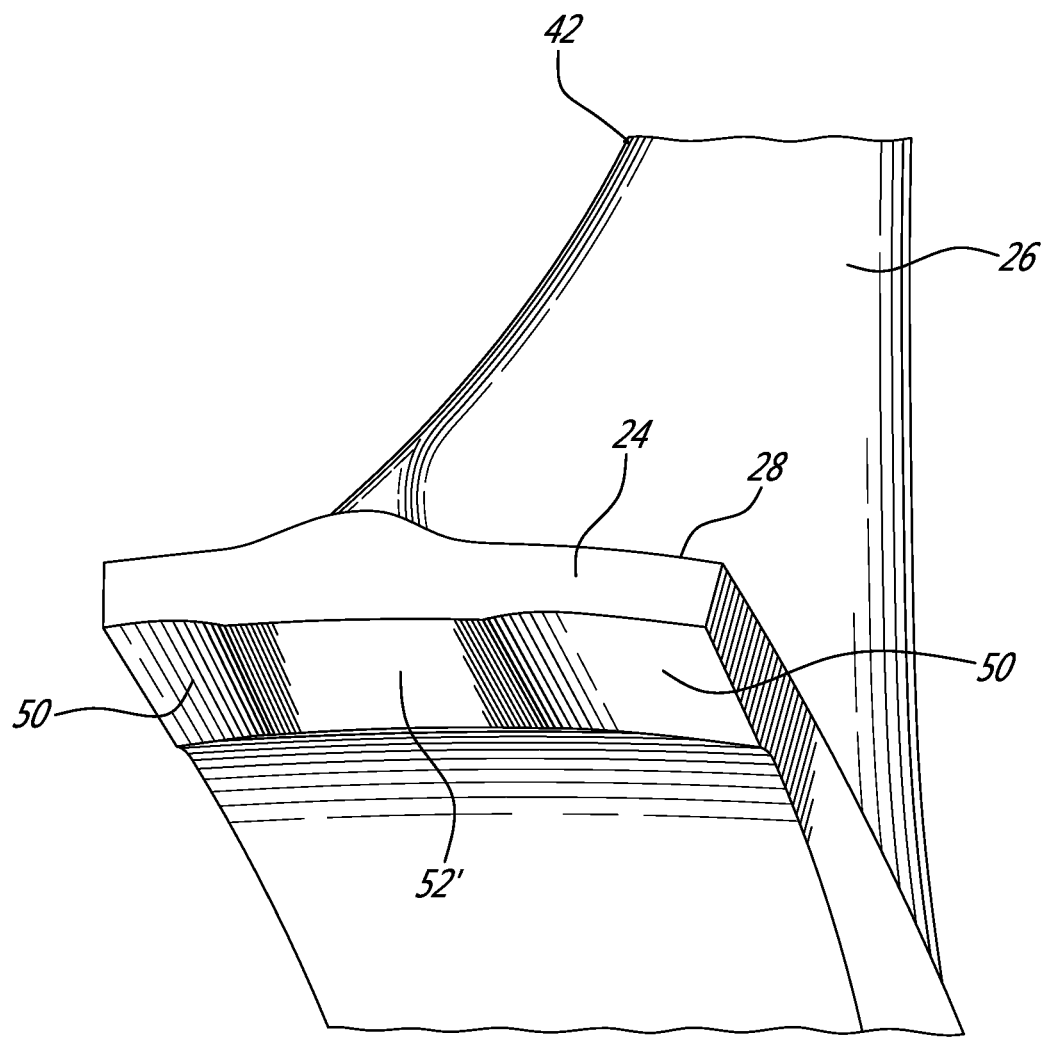
FIG. 5 is an enlarged rear isometric view similar to FIG. 3 but illustrating the balance tab after balancing.

Referring concurrently to FIGS. 2, 4 and 5, it can be appreciated that a circumferential array of stress shielding scallops 50 may be defined in the radially inner surface of at least one of the overhangs 44 and 46 of the rim 24 (the aft overhang 46 in the illustrated example) so as to define a row of circumferentially spaced-apart balance tabs 52 around the rotation axis of the rotor. The tabs 52 project radially inwardly from the radially inner surface of the disc rim 24 concentrically relative to the rotation axis of the rotor. The stress shielding scallops 50 and the resulting balance tabs 52 are part of the drawing definition of the rotor 20 and are thus machined during the initial manufacturing operations of the rotor (i.e. prior to the balancing operations). The scallops 50 may be precisely milled or otherwise suitably machined in the rim surface of the disc 22 as per the original specifications of the rotor. Accordingly, the geometry of stress shielding scallops 50 and of the balance tabs 52 may be pre-established and pre-analysed by numerical models at the design stage of the rotor part (i.e. prior to manufacturing). As will be seen hereinafter, the tabs 52 provide relatively low stress areas from which material may be removed from the disc to offset an imbalance measured on the rotor after the initial manufacturing thereof. The provision of the tabs 52 allows correcting an imbalance by removing material from the disc 22 without inducing high stress concentration notches or grooves as it might be the case with conventional material removal balancing methods.

According to the illustrated embodiment, one balance tab 52 is provided underneath each blade 26 in general alignment with the trailing edge 42 of the blade. That is each tab 52 is radially aligned with a corresponding blade 26. However, it is understood that the number of balance tabs 52 could differ from the number of blades 26 and also that the tabs 52 and the blades 26 could be angularly or circumferentially offset with respect to one another. The tabs 52 are sized (radial height and axial depth) to permit removal of a predetermined weight of material which is sufficient to compensate for rotor imbalances typically encountered during manufacturing of rotors. As can be appreciated from FIG. 4, the tabs 52 may have a tapering profile (i.e. the section of the tab is greater at the base than at the tip thereof). A fillet is defined between each tab 52 and the neighbouring scallops 50. The radius of the fillet at each end of a scallop 50 is selected to maintain the stress in the scallops to an acceptable level.

After having been machined to its final dimensions, the rotor 20 may be subject to a surface inspection and to a surface treatment operation. For instance, the rotor 20, including the scallops 50, may be blue etch inspected and peened. The provision of the tabs 52 allows to perform the surface inspection and the surface treatment steps prior to balancing, thereby avoiding any risk of residual imbalance that could be induced by these surface inspection and treatment operations. Indeed, the tabs 52 are much lower stress areas than the scallops and, thus, any subsequent machining thereof to correct a measured rotor imbalance does not need to be necessarily followed by etching and peening operations.

Once the etching and peening operations have been completed, the rotor 20 may be tested to detect a rotor imbalance. If a rotor imbalance is measured, a selected tab or selected tabs may be machined away to offset the measured imbalance. For instance, as shown in FIG. 3, three tabs 52' may be machined away to a reduced height. A straight cut may be made through each tab 52' to remove the desired amount of material therefrom. Accordingly, the material may be removed without introducing a high stress concentration zone, such as a notch or groove, in the disc. The other tabs 50 are shown in their initial as-machined conditions. The amount of material removed from the tabs, the number of tabs to be machined and the location thereof is function of the imbalance to be corrected. FIG. 4 shows a tab 52 in its initial as-machined condition. FIG. 5 shows the same balance tab 52' after it has been machined off to its minimal material condition. The minimal material condition of the tabs is limited by the minimum allowable tab height. If the balance tab was removed completely so that the tab height was zero (the tab is flush with the bottom of the stress shielding scallops) then the stresses in the area where material was removed would be higher than ideal. So a minimum height of tab needs to be maintained so that the stresses in the area where material is removed is low enough. If the neighbouring scallop was deeper then the amount of material that could be removed from the tab would be greater (such that the minimum tab height is maintained).

According to one embodiment, the manufacturing process involves the milling of multiple circumferentially spaced-apart stress shielding scallops around an axis of the rotor during the initial machining operations. These scallops are part of the drawing definition and therefore there is virtually no geometry variation from scallop to scallop and they are easily analyzed. Coolant may be used during the machining of the scallops and the surface finish may be well controlled with no need to perform a polishing operation. The scallops may then be properly blue etch inspected and peened. Any required balance correction may be achieved by material removal at the projecting tabs that are between the stress shielding scallops. In this way, the material removal balancing operation may be performed on much lower stress areas, which are less critical from a fatigue point of view, as compared to conventional material removal methods in which balancing notched are milled into a surface of the rotor. Removing material on the tabs actually reduces the stress in the neighbouring scallops. Since the stresses in these tabs is significantly lower than the stresses in conventional material removal areas, the material can be removed without the same durability concerns that are present when using traditional material removal balancing. The geometry of the material removal is also much less complicated than the conventional material removal. The stresses are low enough at the tabs that it may be possible to move the balancing operation to after the blue etch inspection and peening operations. All this may provide for a rotor part with a lower residual unbalance. The simpler material removal geometry (i.e. straight cut through selected tabs) enable that the material is removed using a manual milling machine rather than using a numerically controlled machine. Having the flexibility to use other machines could streamline the process workflow and result in cost savings.

The above description is meant to be exemplary only, and one skilled in the art will recognize that changes may be made to the embodiments described without departing from the scope of the invention disclosed. For example, the balance tabs could be provided at the front of disc in the undersurface of the forward overhang 44. Also, in some applications, the tabs could project axially from the rim or another surface of the rotor. Still other modifications which fall within the scope of the present invention will be apparent to those skilled in the art, in light of a review of this disclosure, and such modifications are intended to fall within the appended claims.

What is claimed is:

1. A gas turbine engine rotor comprising a disc adapted to be mounted for rotation about an axis, a circumferentially extending rim at a periphery of the disc, a circumferential array of blades extending radially outwardly from a radially outer surface of the rim, a circumferential array of selectively formable balance tabs projecting radially inwardly from a radially inner surface of the rim about the axis of rotation of the disc, wherein circumferentially adjacent balance tabs are spaced by stress shielding scallops defined in the radially inner surface of the rim, wherein the balance tabs, prior to balancing, have a pre-established initial weight, wherein material from selected ones of the balance tabs is removed to reduce said pre-established initial weight to a reduced weight in order to balance the gas turbine engine rotor, wherein the balance tabs are free from holes for receiving rotor balancing weight, and wherein the selected ones of the balance tabs have a radial height that is less than the radial height of other ones of the balance tabs.

2. The rotor defined in claim 1, wherein the selectively formable balance tabs have a tapering profile.

3. The rotor defined in claim 1, wherein the tabs are machineable.

4. The rotor defined in claim 1, wherein a number of the tabs equals a number of the blades.

5. The rotor defined in claim 1, wherein each tab is radially aligned with a corresponding blade.

6. The rotor defined in claim 1, wherein the tabs have a pre-established initial height, and wherein the material from the tabs is selectably removed to reduce the pre-established initial height to a reduced height in order to balance the gas turbine engine rotor.

7. The rotor defined in claim 1, wherein a fillet is defined in the radially inner surface of the rim between each one of the circumferentially adjacent balance tabs and neighboring ones of the stress shielding scallops, and wherein the circumferential array of balance tabs is provided in a cantilevered axially end portion of the rim.

* * * * *